United States Patent [19]
Burke et al.

[11] Patent Number: 5,475,198
[45] Date of Patent: Dec. 12, 1995

[54] WELD POOL VIEWING SYSTEM

[75] Inventors: Michael A. Burke, Pittsburgh; Donald T. Hackworth, Monroeville; Richard A. Miller, North Huntingdon Township; William H. Kasner, Penn Hills Township, all of Pa.

[73] Assignee: Westinghouse Electric Corporation, Pittsburgh, Pa.

[21] Appl. No.: 798,520

[22] Filed: Nov. 15, 1985

[51] Int. Cl.$^6$ ........................................... B23K 9/12
[52] U.S. Cl. ................ 219/124.34; 901/42; 219/130.01; 219/136
[58] Field of Search ................ 219/124.34, 124.32, 219/124.22, 125.1, 125.11, 130.01, 136; 901/9, 42

[56] References Cited

U.S. PATENT DOCUMENTS

| | | | |
|---|---|---|---|
| 4,488,032 | 12/1984 | Case, Jr. et al. | 219/124.34 |
| 4,497,996 | 2/1985 | Libby, Jr. et al. | 219/124.34 |
| 4,521,670 | 6/1985 | Case, Jr. et al. | 219/124.34 X |
| 4,532,404 | 7/1985 | Boillot et al. | 219/124.34 |
| 4,532,405 | 7/1985 | Corby, Jr. et al. | 219/124.34 |
| 4,532,406 | 7/1985 | Povlick et al. | 219/124.34 |
| 4,532,408 | 7/1985 | Richardson | 219/124.34 X |
| 4,542,279 | 9/1985 | Case, Jr. et al. | 219/124.34 |
| 4,567,348 | 1/1986 | Smith et al. | 219/124.34 |
| 4,578,561 | 3/1986 | Corby, Jr. et al. | 219/124.34 |
| 4,590,356 | 5/1986 | Povlick et al. | 219/124.34 |
| 4,591,689 | 5/1986 | Brown et al. | 219/124.34 |
| 4,611,111 | 9/1986 | Baheti et al. | 219/124.34 |

*Primary Examiner*—John B. Sotomayor

[57] ABSTRACT

A weld pool viewing system including optical elements for enhancing the weld pool image is positioned at an angle relative to the axis of a welding torch to extract image information pertaining to the interface of the weld pool with a workpiece to control the welding parameters.

7 Claims, 4 Drawing Sheets

WELD POOL VIEWING SYSTEM

GOVERNMENT CONTRACT

This invention resulted from work performed under U.S. Government Contract B00600-84-C-3294 funded by Naval Sea Systems Command.

BACKGROUND OF THE INVENTION

Weld quality control in automated, remote or autonomous welding requires real time monitoring of the weld pool in order to provide sensory feedback from the welded as it is being made. This procedure is analogous to the functions of a human welder as he watches the position and size of the weld pool and, in turn, modifies his positioning of the torch, or varies the welding parameters, to produce a weld structure that accommodates fit-up and distortion induced discrepancies in the welded preparation. In order to provide a useful weld pool viewing system for production welding, a system design must incorporate features that provide a clear view of the weld pool, its local surroundings and its contact with the workpiece while being compactly packaged and positioned relative to the welding torch to minimize physical interference with weld torch access to a confined workpiece configuration, such as the weld seams of a three-surface 90-degree corner arrangement.

The major difficulty encountered in viewing weld pools derives from the severe gradients of light intensity that are developed across the scene in the presence of the welding arc. The brightness of the arc generally either overpowers the average brightness of the weld pool scene leaving the surrounding regions in relative darkness which does not permit the resolution of relevant features by a camera, or overloads the corresponding region of the camera detector causing "blooming" or lateral growth of the high intensity arc region.

SUMMARY OF THE INVENTION

There is described herein with reference to the accompanying drawings a weld pool vision system positioned in combination with a welding torch to view the weld pool from an angle relative to the axis of the welding torch. A preferred position is in advance of the motion of the welding torch which provides a scene including the seam, the weld pool and the arc. A series of optical elements positioned within a tubular viewing port define an optical path to effectively transmit a weld pool image to a camera which generates weld pool information for controlling the weld pool quality.

The tubular viewing port extends from the shield gas cup of the weld torch to provide visual access to the weld pool. A series of lens and filters are positioned within the tubular viewing port behind an initial transparent quartz plate window which functions to isolate the optical elements from the smoke and debris associated with the arc. The information from the camera is transmitted to a vision process computer which, in turn, communicates with a weld process computer to effect changes in the weld process parameters to maintain weld pool quality in response to the information derived from the weld pool image.

The weld pool viewing system described above provides full scene viewing of an area of about 1"×1" around the weld pool. This scene is projected ultimately onto a CCD detector array of a solid state camera. An auto-iris and automatic gain control circuitry associated with the commercially available solid state camera are adjusted so that the viewing system is self-adjusting to accommodate workpiece materials of any expected reflectivity such as dark hot-rolled steel plate and bright aluminum. The optical elements positioned within the tubular viewing port include a narrow band optical filter to reduce intensity gradients due to the welding arc, a transfer lens to provide an image of the weld pool at a plane along the optical path and a spot, or gradient, density filter positioned in the image plane of the transfer lens to reduce the light intensities due to the arc. A neutral density filter can also be positioned within the optical path to reduce the integrated light intensity that reaches the camera system. Optical prisms positioned within the optical path effectively bend the optical path to minimize the physical projection of the viewing system from the welding torch thereby minimizing the physical interference of the viewing system with the welding function, and further providing an increased optical path length within the limited physical space to improve the depth of field of the viewing system.

The disclosed arrangement facilitates feature extraction from the weld pool and the weld seam in advance of the weld pool during welding operations.

BRIEF DESCRIPTION OF THE DRAWINGS

The invention will become more readily apparent from the following exemplary description in connection with the accompanying drawings.

DESCRIPTION OF THE PREFERRED EMBODIMENT

While it will be apparent from the discussion that the novel weld pool vision system can be employed with both MIG welding applications where the welding wire is consumed, and TIG welding applications where a non-consumable electrode is employed to support the arc, the typical embodiment chosen to illustrate the invention is a MIG welding application. The novel weld pool vision system described below provides a unique technique for observing and/or controlling gas metal arc (GMA) weld pools. The weld pool vision system described herein is suitable for use as a sensor in remote welding applications, or for use in a control system in a high quality robotic welding application as shown in FIG. 1.

Figure 1:
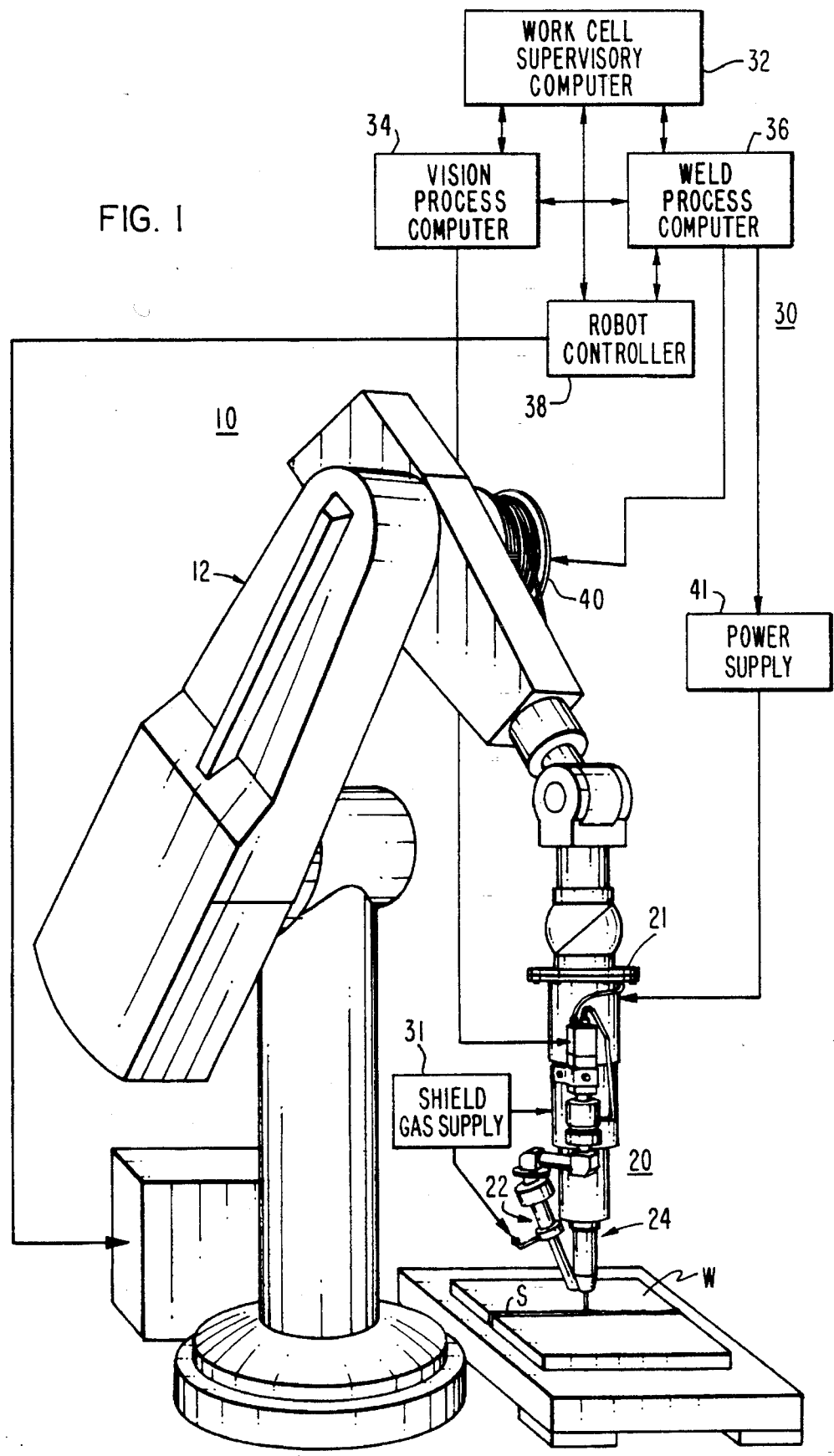
FIG. 1 is a block diagram schematic of a welding system including the novel weld pool vision/welding torch combination.

Referring to FIG. 1, there is illustrated a robotic welding system 10 including a multi-axis robot manipulator apparatus 12 having a weld pool vision/welding torch combination 20 secured to a robot end effector 21 for positioning relative to the seam S of a workpiece W in response to a control system 30. A typical implementation of the control system 30 includes a work cell supervisory computer 32, a vision process computer 34, a weld process computer 36 and a robot controller 38. The multi-axis robot manipulator 12 is controlled by the robot control 38 which, for the purposes of discussion, corresponds to the VAL™ controller commercially available from Unimation Incorporated. The work cell supervisory computer 32 functions to download software programs to the vision process computer 34, the weld process computer 36 and the robot controller 38. The weld process computer 36 controls both the weld wire feed mechanism 40 and the welding power supply 41.

The weld pool image information developed by the vision system 24 is supplied to the vision process computer 34 and made available to both the work cell supervisory computer 32 and the weld processor computer 36 to effect the operation of the welding process at the seam S of the workpiece W in response to the weld pool characteristics extracted by the vision system 22. The weld pool vision system 22 is positioned in advance of the direction of travel of the weld torch 24 to view the weld pool scene comprising the arc A, the weld pool P and the seam S in advance of the weld pool P. The vision process computer receives the digital information corresponding to the weld pool scene derived by the vision system 22, extracts data from the image and provides information to the weld process computer 36 to control the welding parameters via the wire feed unit 40 and the welding power supply Similarly the information relative to the movement and position of the arc A is available to the robot control system 38 to control the positioning of the welding torch 24 relative to the seams.

Figure 2A:
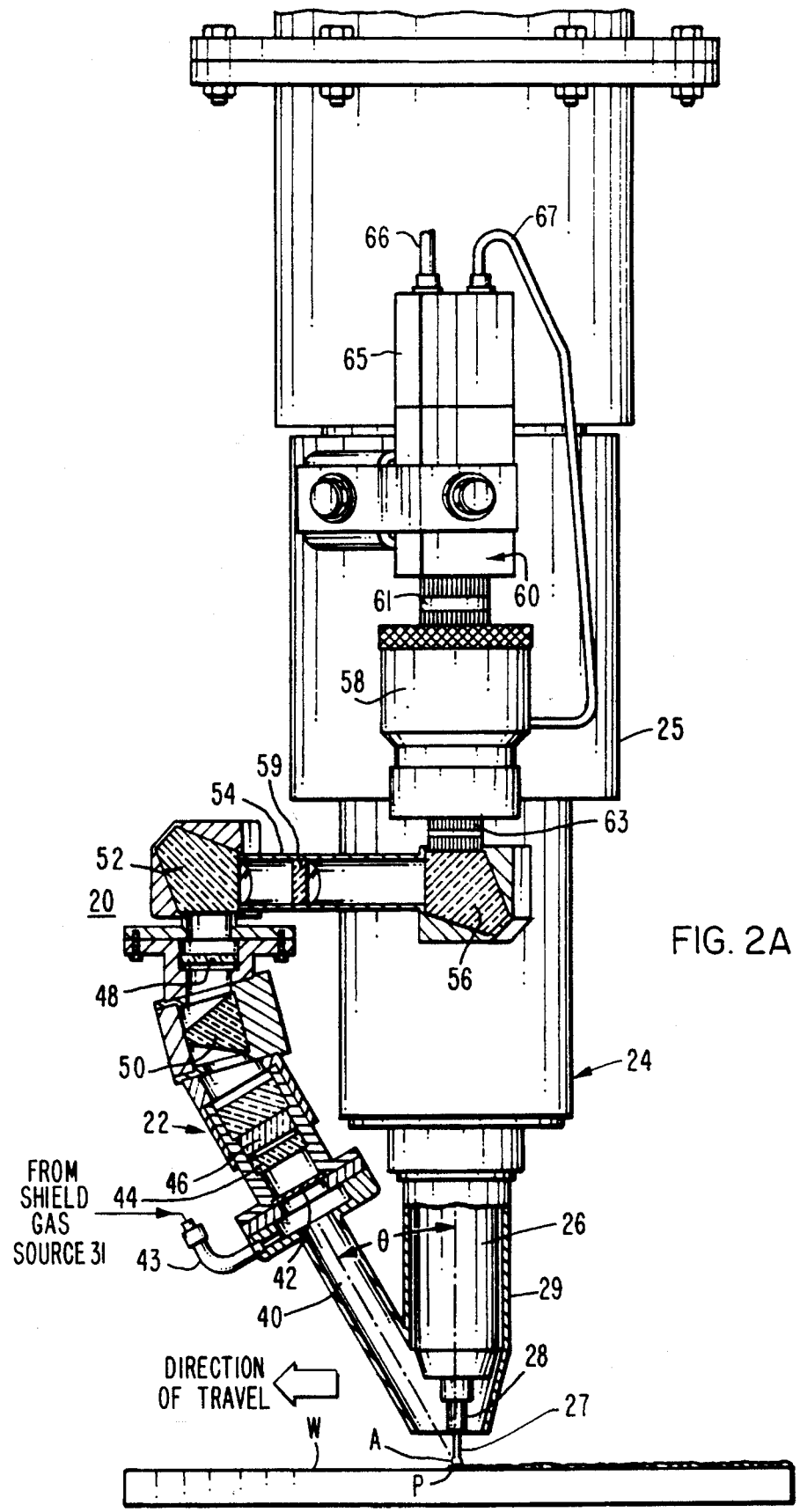
FIG. 2A is sectioned schematic illustrations of the weld pool vision/welding torch combination embodying the invention and employed in the system of FIG. 1.
Figure 2B:
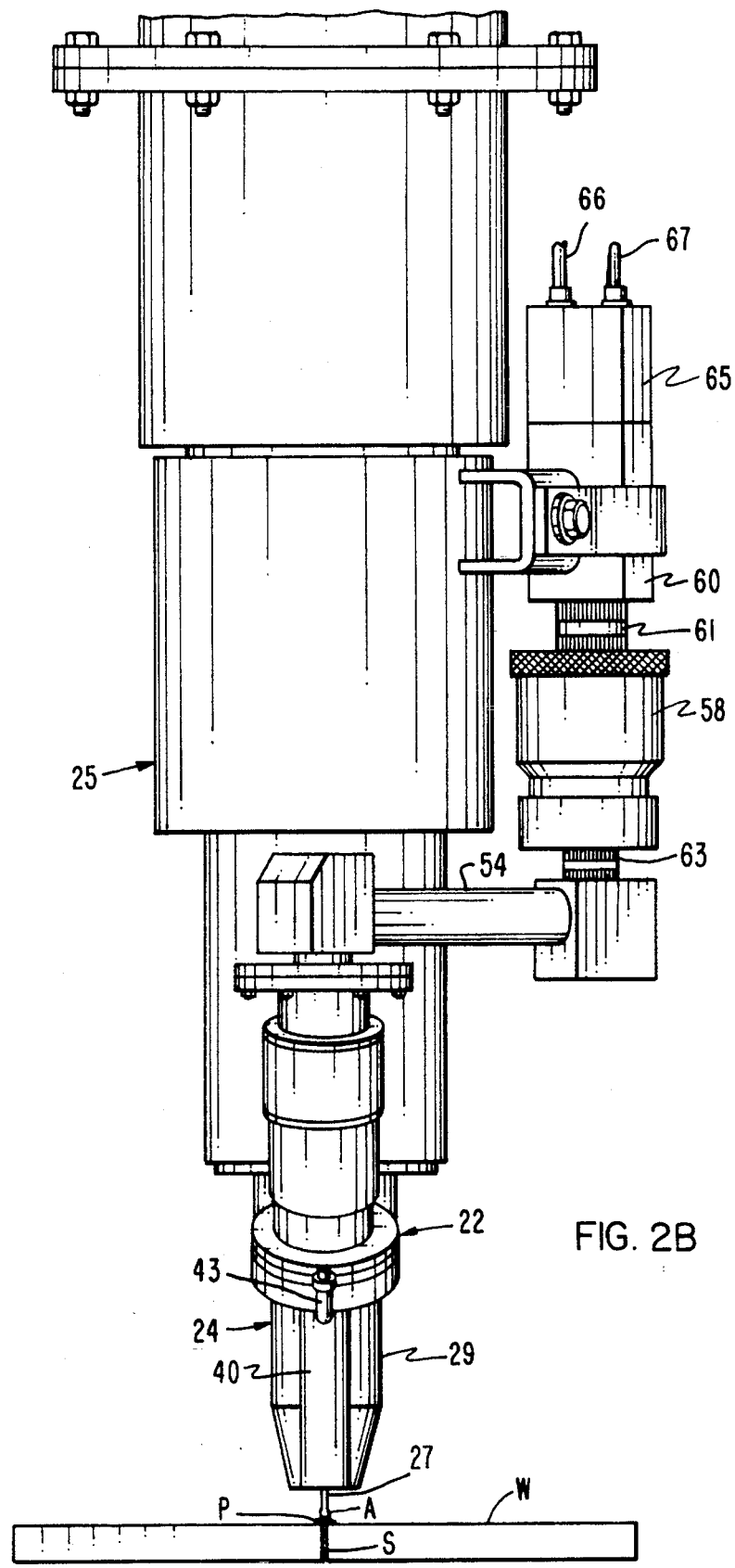
FIG. 2B is a perspective view of the weld pool vision/welding torch embodiment of FIG. 1.

The weld pool vision/welding torch combination 20 is shown in detail in FIGS. 2A and 2B. The welding torch 24 includes a housing 25, a torch body 26, and welding wire 27 extending through a contact tip 28 located within a tubular shield gas cup 29. The shield gas cup 29 functions to direct shield gas from the gas source 31 through the housing 25 to the weld pool site and to produce the arc A between the weld wire 27 and the workpiece W.

Figure 4:
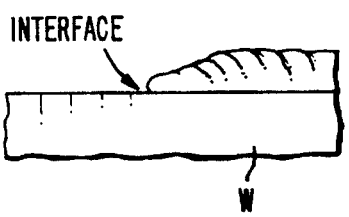
FIG. 4 is a schematic illustration of the weld pool contacting the workpiece.

The weld pool vision system 22 is comprised of a series of optical elements and prisms disposed within a tubular viewing port 40 extending from the shield gas cup 29 at an angle θ with respect to the vertical axis of the weld torch 24 in advance of the movement of the weld torch 4 to provide viewing of the weld pool P. The optical lenses, prisms and filters defining the optical path transfer the weld pool image to the silicon charge coupled device (CCD) detector array of the solid-state camera 60 from which the image data is transmitted to the vision process computer 34. The angle θ of the viewing port member 40 to the vertical axis of the welding torch 24 is selected to provide sufficient advanced viewing of the weld pool P to define the weld pool shape and interface with the workpiece W (as shown in FIG. 4) while minimizing the physical projection of the vision system 22 to limit physical interference of the vision system 22 within the workpiece environment. The ability to view the weld pool P from a position in advance of the direction of travel of the weld torch 24 enables the vision system 22 to extract image information to identify the size of the weld pool, the interface of the weld pool with the workpiece W and the position of the weld pool P and arc A with respect to the seam S. The advance angular position of the viewing system 22 provides a weld pool image corresponding to that of FIG. 4 from which it can be readily determined if the base metal of the workpiece W is being melted in a sufficient manner to allow the weld deposit to flow into the base metal of the workpiece W and achieve the desired wetting of the base metal material. In terms of the solidified weld, the desired wetting assures a desired mechanical tie-in to the base metal to produce a continuous metal material in the weld with minimum porosity. Experimental operation suggests an angle θ of between approximately 25° and 35° achieves the above objectives.

Inasmuch as image quality can be improved by extending the optical path length, an extended optical path length is achieved within the limited physical space available by folding the optical path through the use of appropriate prisms as suggested in FIGS. 2A.

The elements defining the optical path of the viewing system 22 include a glass window 42 located at a position within the viewing port 40 at a distance sufficient from the welding arc A to reduce damage by spatter while at the same time protecting the remaining optical elements from condensation and smoke damage. While the glass window 42, which is typically a quartz window, may be considered a sacrificial element subject to replacement on a regular basis, the useful life of the window 42 is enhanced by directing a gas stream through a tubular coupling 43 across the face of the window 42 to minimize smoke damage to the glass window 42. The gas stream may correspond to an auxiliary supply of the shield gas from the gas source 31. The distance between the welding arc A and the viewing window 42, i.e., 4 inches, is selected such that sparks emitted from the weld scene cool during their flight through the gas before reaching the window 42.

Following the viewing window 42 in the optical path of the vision system 22 is a neutral density filter 44 to alter the light intensity of the imaged weld pool scene so that the viewing system 22 can operate in its most effective intensity band. Following the neutral density filter 44 is a transfer lens 46. In the specific embodiment the filter 46 has a focal length of 50 mm. The transfer lens 46, which is shown as a commercially available compound lens, functions to form an image of the weld pool at a subsequent location along the optical path. In order to minimize the forward projection of the vision system 22 a 47° prism 50 is oriented to direct the optical path of the vision system 20 in parallel with the axis of the weld torch 24.

While commercially available CCD cameras, such as the SONY Model XC37, are not as susceptible to intensity-overloaded phenomena as previous camera types, and thus could be used to directly view the weld pool scene image produced by the transfer lens 46, it has been determined that the positioning of a gradient density, or spot, filter 48 at the image of the weld pool scene produced by the transfer lens 46 enhances the image definition and contrast to improve the quality of the image received by the camera 60. The gradient density filter 48 functions to provide a dark region in the image area location of the arc A associated with the weld pool P while allowing the free passage of light from the region surrounding the weld pool image. Thus, the intensity gradients across the weld pool image are reduced. The image produced by the gradient density filter 48 is transmitted via 90-degree prism 52, tubular coupling 54 and 90-degree prism 56 through the auto-iris lens assembly 58 coupled to the camera 60.

A narrow band filter 59 is positioned within the tubular coupling 54 between the prisms 52 and 56 to accommodate the operational characteristics of presently available commercial CCD cameras. The purpose of the narrow band filter 59 is to restrict the spectral wave band of the arc as viewed by the camera 60. The welding arc intensity is a maximum in the UV blue end of the visible spectrum, while the intensity from hot metal, namely that of the weld pool scene and the adjacent region, peaks in the infrared portion of the spectrum. Ideally, it is therefore desirable to view the infrared which most closely corresponds to the weld pool image of interest. Inasmuch as many commercially available cameras are designed to operate in a region between the visible to the near infrared, a narrow band filter 59 in the 700 nanometer range provides an optimum compromise between camera hardware and weld pool image quality.

The optical path deflection produced by the 90-degree prisms 52 and 56, which may be typically Pentax prisms, effectively removes the optical path of the vision system 22 from in front of the welding torch 24 to the side of the welding torch 24 in order to allow the camera system 60 to be mounted away from the forward movement of the welding torch 24. As noted earlier, the prisms 52 and 56 also function to increase the optical path length of the vision system 22 within a fixed physical space, thereby improving the depth of field of the viewing system 22. The depth of field provided by the vision system 22 is sufficient to allow the weld pool scene to remain in focus as the angle of the weld torch 24 is tilted, such as to allow the torch 24 to access the apex of a 90-degree corner of a workpiece.

The neutral density filter 44 and the optional use of the auto-iris lens 58 maintain the intensity of the welding arc image below the levels at which "growth" or "blooming" will occur on the CCD detector array of the camera 60.

In the embodiment illustrated, the weld pool image is viewed by the camera 60 through a 75 mm. auto-iris lens 58 including a 2X C-mount extender lens 61 between the camera 60 and the auto-iris lens 58 and a 4X extender lens 63 in front of the auto-iris lens 58. This configuration permits the lenses to be focused on the weld pool image plane corresponding to the gradient intensity filter 48.

The auto-iris lens 58 and the automatic gain control circuitry of the camera 60 are adjusted so that the viewing system 22 is self-adjusting to accommodate work-piece materials of any expected reflectivity such as dark, hot-rolled steel plate or bright aluminum. The auto-iris lens 58 automatically regulates the intensity of light that falls on the detector array of the camera 60 and allows automatic operation of the vision system 22.

The C-mount extenders 61 and 63 associated with the auto-iris lens 58 function to magnify the weld pool scene image so that the image completely fills the detector array of the solid-state camera 60. In addition to the detector array, the camera 60 includes a power supply and signal conditioning circuitry 65 and two electrical cables 66 and 67. Cable 66 provides signal communication with the weld processor computer 36 and further carries a 12-volt power supply to the camera power supply unit. Cable 67 provides electrical connection and control between the camera 60 and the auto-iris lens 58.

Figure 3:
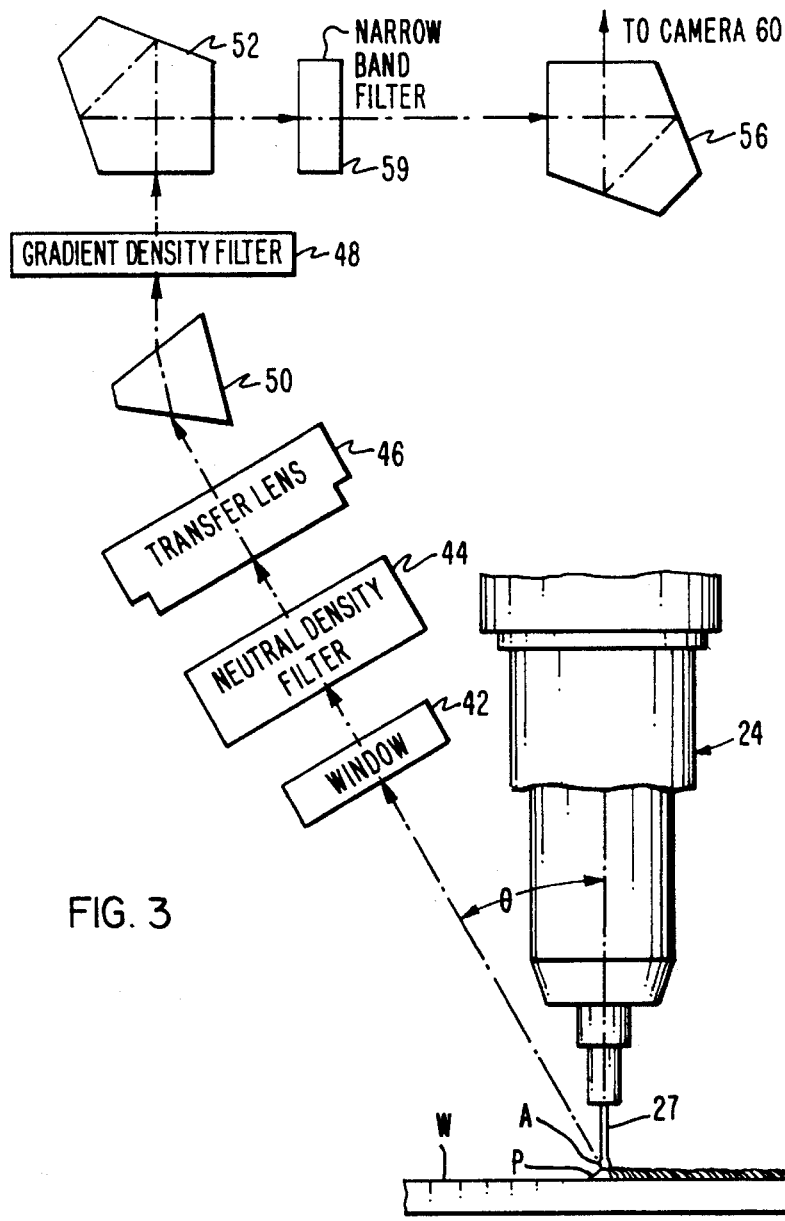
FIG. 3 is a functional schematic illustration of the weld pool vision system of FIG. 2.

A flow diagram of the optical path and elements comprising the vision system 22 is depicted in FIG. 3.

A further apparatus typically employed in a welding system to enhance weld quality is a torch oscillating mechanism. Such a mechanism may be added to the vision system/weld torch combination 20 without effecting the quality of the weld pool monitoring function of the vision system 22 by implementing transverse weld torch oscillation within the shield gas cup 29. During welding with transverse oscillation, the extremes of the weld pool remain stationary within the field of view of the vision system 22 while the torch tip 28 is observed to oscillate. An oscillator is included to provide oscillation of the weld torch laterally with respect to the direction of travel of the weld torch in order to spread the bead and provide improved weld quality. Typically, the oscillator would be a mechanical oscillator mounted at 90 degrees to the tubular viewing port 40 in order to provide the lateral oscillation.

Figure 5:
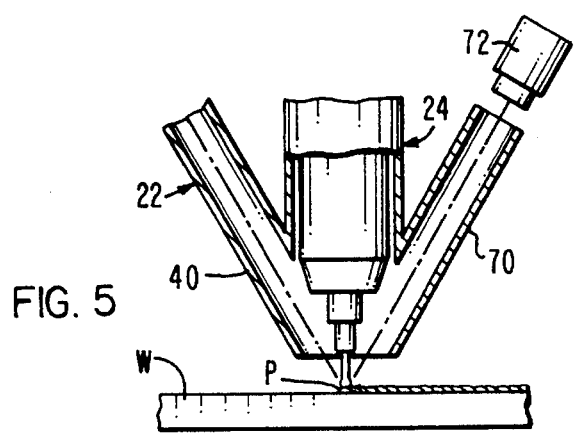
FIG. 5 is an illustration of a variation of the embodiment of FIG. 2A to accommodate weld pool backlighting.

The vision system 22 as disclosed herein operates without the need of supplemental or external lighting other than that produced by the welding process itself. While the absence of a requirement for backlighting of the weld pool seam permits the construction of an integrated weld torch/vision system of reduced size and weight suitable for use in confined workpiece environments, the disclosed vision system/weld torch combination 20 can be adapted for use with backlighting. If backlighting is employed, the backlighting must be provided in the same spectral region transmitted by the narrow band filter 59. Backlighting of the weld pool scene, including the arc, will reduce the light intensity gradients over the entire scene. In this way, the intensity of the arc can be diminished from dominating the well pool scene. Suitable backlighting sources include YAG lasers of the 1.06 micron wavelength, laser diodes at about 800 nanometers wavelength and helium-neon lasers at about 600 nanometers. In all cases, it is important to match the narrow band filtering of the vision system 22 with the source of illumination. While narrow band sources of illumination are preferred, a wide band wave source can be used for backlighting. An example of such a source is an arc lamp that provides sufficient intensity in the infrared region. A typical implementation of backlighting can be achieved as illustrated in FIG. 5 by the addition of a backlighting port 70 and light source 72 to the shield gas cup 29.

The weld pool vision system described herein can, in essence, replace the function of a seam tracker by actually viewing the molten weld pool at the seam and modifying the weld process before the bead solidifies to achieve weld process adjustments to effect improved weld quality. A typical weld process modification in response to viewing the molten weld pool would include the laying down of more metal to widen the weld bead. This contrasts with the conventional weld tracking system which is positioned in advance of the weld torch and out of view of the molten weld pool. Thus, in the disclosed system, the weld pool vision system 22 views the weld pool P and the seam S as the weld pool is traversing the seam such that the weld seam S appears to be moving into the weld pool P. The weld process modifications are made in response to the weld pool characteristics as contrasted with either a weld seam tracker that detects the seam before the weld, or a weld beam contour monitor that detects the solidified weld.

In applications where a conventional weld seam tracker is to be included with the disclosed weld pool vision system, the weld pool vision system may be moved to an angle off the seam S to permit the mounting of the seam tracker immediately above the seam in advance of the direction of travel of the weld torch 24. In this configuration, information from both the vision system 22 and the seam tracker is provided to control the operation of the robot manipulator and weld process.

We claim:

1. In a welding system, the combination of, a welding torch means for producing a weld pool at the seam of a workpiece in response to an arc contacting the workpiece, first means for positioning and moving said welding torch means along a direction of travel relative to the seam, second means for controlling the welding parameters of said welding torch means, vision means for viewing the weld pool at an angle relative to the axis of said welding torch means so as to produce a weld pool image including the interface of the weld pool with the workpiece and generating signals indicative thereof, said signals being transmitted to said second means to control the quality of the weld produced at the seam of the workpiece, said vision means including, a tubular viewing port angularly disposed in advance of the direction of travel of the welding torch means and having an open end for viewing the weld pool and weld pool interface with the workpiece, a camera means optically coupled to the opposite end of said tubular viewing port, a series of optical elements positioned within said tubular viewing port to define an optical path, said elements comprising, a transfer lens means for forming an intermediate image of the weld pool at a position along said optical path, a gradient density filter means positioned coincident with the image plane of the transfer lens to effectively darken the portion of the intermediate image corresponding to the arc thereby reducing the intensity gradients across the weld pool image, and a camera means for viewing the weld pool image developed by said gradient density filter and transmitting weld pool image information to said second means.

2. In a welding system as claimed in claim 1 wherein said welding torch means includes weld wire extending through a contact tip for sustaining a weld arc relative to said workpiece, said contact tip and weld wire being positioned within a tubular shield gas member which directs shield gas flow into the region of the weld pool, said vision means including said tubular viewing port means extending from said tubular shield gas member to provide viewing of the weld pool in advance of the welding torch means.

3. In a welding system as claimed in claim 1 wherein said vision system further views the welding arc and transmits signal information to said first means for controlling the position of said welding torch means relative to the seam.

4. In a welding system as claimed in claim 1 wherein said first means includes a robot manipulator apparatus and a robot controller, said second means including a vision process computer for processing the image information from the camera means and a weld process computer for responding to inputs from the vision process computer to alter the weld process parameters at the workpiece in response to the image information developed by said camera means.

5. In a welding system as claimed in claim 1 wherein said camera is a solid state camera having a charge coupled device detector array for extracting information from the weld pool image.

6. In a welding system as claimed in claim 1 wherein said angle of viewing is between approximately 25° and 35°.

7. In a welding system as claimed in claim 1 wherein said series of optical elements further include a viewing window means at the open end of said tubular viewing port to isolate the other optical elements from the hostile environment of the weld arc and weld pool.

* * * * *